Figure 1:
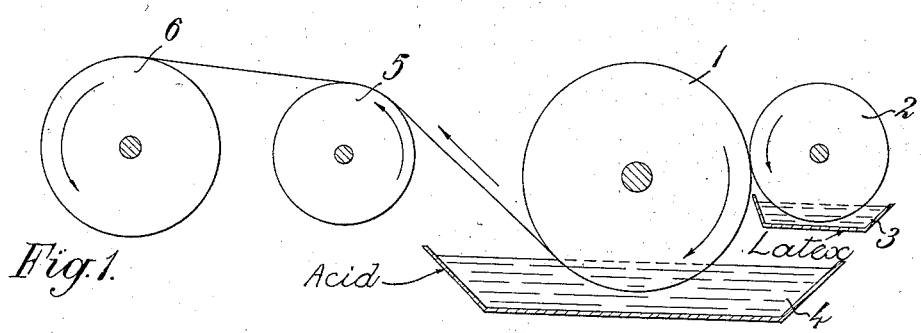

June 27, 1939.  T. L. SHEPHERD  2,163,986
RUBBER PROCESS
Filed May 13, 1935  2 Sheets-Sheet 1

T. L. Shepherd
INVENTOR
By Glascock Downing & Seebold
Attys.

June 27, 1939.    T. L. SHEPHERD    2,163,986
RUBBER PROCESS
Filed May 13, 1935    2 Sheets-Sheet 2

Patented June 27, 1939

2,163,986

UNITED STATES PATENT OFFICE 2,163,986

RUBBER PROCESS

Thomas Lewis Shepherd, London, England

Application May 13, 1935, Serial No. 21,264
In Great Britain May 12, 1934

3 Claims. (Cl. 18—54)

(Granted under the provisions of sec. 14, act of March 2, 1927; 357 O. G. 5)

This invention relates to a method of and apparatus for making threads, filaments or bands from rubber or latex hereinafter generically termed thread from coagulable dispersions of elastic materials such as rubber latex hereinafter referred to as "latex".

One object of the invention to be hereinafter described is to obtain a definitely controlled quantity of latex before coagulation takes place with the result that the finally coagulated product is during the process continually controlled as regards thickness and shape.

Another object of the invention is to make sure of uninterrupted production without any breakages of the thread such as often occurs in extrusion methods where the latex is extruded from or through an orifice in a nozzle with consequent clogging of the orifice.

Another object of the invention is to overcome certain difficulties in processes where the latex is deposited in grooves in intaglio engraved rollers or belts, the resultant coagulated and dried rubber thread in these grooves adhering to the bottom and walls of such grooves and consequently being subject to breakages.

Experiments and research have shown that the principle of making a filament by applying the appropriate solution to the thin edge of a disc wheel and then immersing such edge in a coagulating bath, may be developed in various ways, and these variants of such a principle form a further object of the invention hereinafter described.

The invention consists in a process of producing rubber thread or the like, which consists in applying latex to a rotating member, transferring the latex to a second rotating member, coagulating the latex upon the second rotating member, and withdrawing the coagulum from said second rotating member.

The invention also consists in a process of producing rubber thread or the like, which consists in applying latex to a rotating member, transferring the latex to a second rotating member, coagulating the latex upon the second rotating member, withdrawing the coagulum from said second rotating member, and drawing out the coagulum lengthwise.

The invention also consists in a process of producing rubber thread or the like, which consists in applying latex to a wire or yarn, coagulating the latex upon the wire or yarn, and withdrawing the coagulum from the wire or yarn.

The invention also consists in a process of producing rubber thread or the like, which consists in applying latex to a wire or yarn, coagulating the latex upon the wire or yarn, splitting the coagulum, withdrawing the coagulum from the wire or yarn, and drawing out the coagulum lengthwise.

The invention also consists in processes for producing rubber thread or the like, substantially as described.

The invention also consists in rubber thread when produced by any of the methods hereinafter described.

The invention will be described by way of example with reference to the accompanying drawings, in which Figures 1 to 7 show diagrammatically arrangements suitable for the processes described.

In carrying the invention into effect by way of example, in Figure 1, a disc 1 of any required diameter is adapted to rotate on a spindle bearing, this disc having preferably a fine knife edge, although depending upon circumstances any other cross-sectional form of edge may be used. There is now applied to this fine edge by a disc 2 dipping in a bath 3 a line of the required width and thickness of latex, which is either non-viscous or viscous according to the method by which such a line is applied. Any other suitable method of applying the latex may be used. The latex may be compounded so that on drying it forms a vulcanised thread or which will be vulcanised when brought into contact with suitable agents such as heat, chemicals or otherwise.

The disc being constantly supplied with the described layer in a fine thread-like form subsequently by its rotational movement passes the applied layer into a bath 4 filled with acetic acid of a suitable strength or filled with any other known and suitable coagulant. The disc rotates into this coagulant so that the bottom edge only just touches the surface of the liquid or the disc edge may be substantially immersed into the coagulant as deeply as required or suitable, whereupon the line of latex is immediately brought into contact with the coagulant, coagulation commences and the line of latex now becomes progressively firm and solid. The thread which is now in the course of coagulation is then led away from the disc either when it is in the coagulant or when it has left it and is pulled continually by means of a rotating drum 5, the pulling action or tension causing the coagulating thread to assume as a result of the stretching caused by the pulling action a more or less round shape in cross section, whilst any imprint made by the edge of the disc will be obliterated.

The pulling or tension roller may run in coagulant itself or it may be continuously provided with any suitable powder to prevent tackiness of the thread, whilst behind the pulling roller there may be a second roller 6 running at any suitable speed which is either similar to the first drum or faster, to ensure the perfect transformation of the thread into the round shape desired. Between these two drums 5 and 6 the thread may also be powdered if required; drum 5 or 6 may also serve as a winding drum to be replaced by empty ones as soon as the old ones have had wound thereon a sufficient length of thread.

Although a method has been described which produces a thread which is round in cross section, arrangements may also be adopted which will leave the thread in exactly the same shape as it was when it was applied in an uncoagulated form on the edge of the disc and if such a thread is required, very little or no pull at all will be necessary to separate the coagulating thread from the edge of the disc.

When the thread has left the disc, it is advisable to clean the edge of the latter which is now rotating again towards the point at which it will receive a new supply of latex, from any matter which is still adhering to the edge chiefly coagulant, as this coagulant might cause coagulation during a new supply of latex. Such a cleaning it will be understood may be effected in any suitable way by any known or suitable methods or contrivances.

Each disc will consequently produce a continuous thread and a series of discs may be employed so that a large number of continuous threads may be simultaneously manufactured and produced.

Instead of a knife edge being given to the disc, any suitable form of edge in cross section may be used such as an edge-like and continuous ribbon, but the actual procedure of applying the latex into a predetermined shape on to the edge and completing the process of coagulation in the presence of this edge still holding the latex, remains essentially the same as also the subsequent processes of pulling the thread into a round cross sectional shape or leaving it in its practically original shape by exercising very little or no pull on it whilst it is being separated from the edge, and the winding and powdering and so forth.

Figure 2:
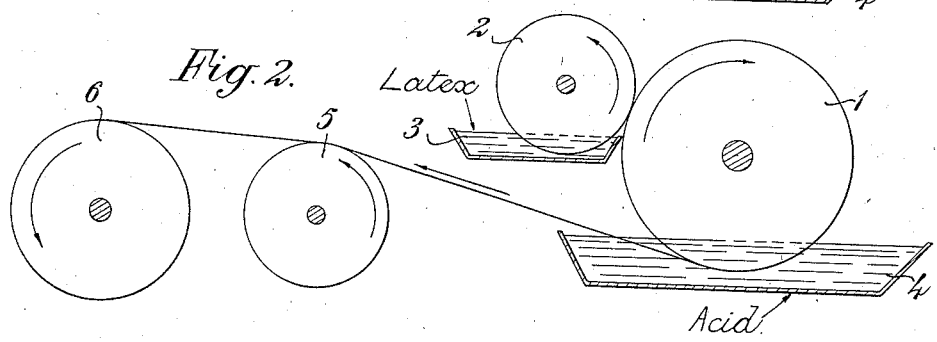

In carrying the invention into effect according to an embodiment, Figure 2, a disc wheel 1 is adapted to be lightly immersed at its lower edge in a bath 4 of any suitable coagulating liquid such as acetic acid, alcohol, water or the like. The disc (hereinafter referred to as the forming disc) has a fine edge and on one side of the disc it is made to run in contact with a supply roller or disc 2 which is adapted to be partly immersed in a bath 3 of liquid rubber solution, an aqueous dispersion of latex or any other form of rubber solution (hereinafter referred to generally as solution), whereby the edge of the forming disc will receive from the supply roller a thin thread of solution. This thread is received on the up-going side of the forming disc and such thread is carried round continuously with the disc and eventually causes such thread to be immersed in the coagulating liquid provided in the bath 4. Immediately the latex comes into contact with the acid or other coagulant, it coagulates the latex into a thread and such thread may then by the continued rotation of the forming disc be drawn off on to another roll 5 where it may be dried and subsequently vulcanised. The forming disc continues its rotation and before it receives a new charge from the supply roller, the edge of the forming disc is thoroughly cleaned so that the new thread of latex will be received on a clean surface.

Figure 3:
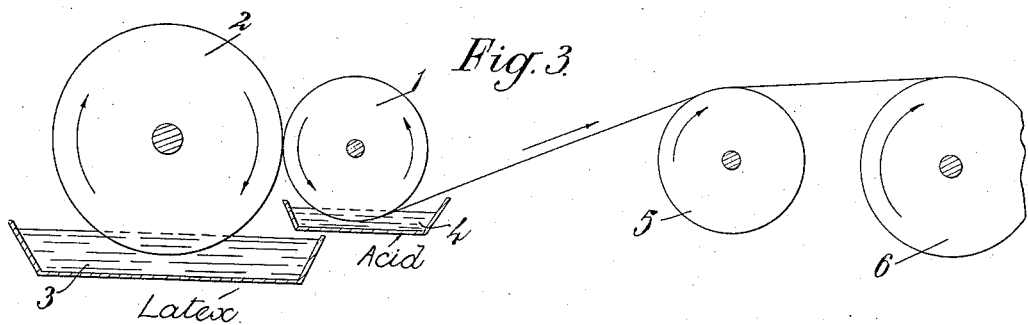

In Figure 3, the forming disc 2 is adapted to run in a clockwise direction with its lower edge lightly immersed in a bath 3 of solution and by its rotation the disc picks up a thin thread of the solution and raises it out of the bath and carries it round till on the down-coming side it is brought into contact with an acid supply roller or disc 1 adapted to run in a bath 4 containing the particular form of coagulant that is to be used.

Directly the thread of solution meets the acid or the thread of acid on the roller or disc, coagulation commences and will be completed by the downward movement of the coagulating thread into the coagulating bath and the more or less completed thread may now be drawn off by rollers 5 or other devices so that it may be dried and subsequently vulcanised.

Figure 4:
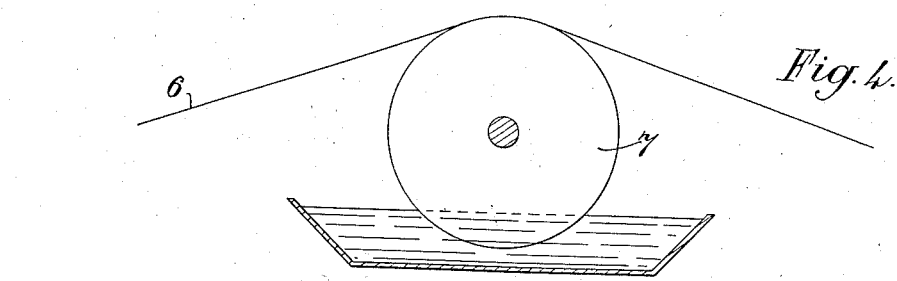

According to a modification an example of which is illustrated in Figure 4, a continuous or a non-continuous yarn or a wire 6 is coated by suitable and known means with latex and this coated yarn or wire carrying the predetermined quantity (in the right shape) of latex is brought into contact with a suitable coagulant as above mentioned either by means of immersion, spraying the coagulant on to the covered yarn or thread or by running it over a roller 7 plain or grooved bearing a film of coagulant. Upon contact with this coagulant the latex coating or film commences to coagulate and at the required point either during or after coagulation has occurred, the now fairly solid rubber tube around the yarn or wire is divided or split and this split miniature tube of rubber is led away with or without tension for further treatment as above described. A comparatively slight pull given to the split tube whilst it is in the finished or (so long as it is not dry) unfinished coagulation state, will convert it into a more or less round thread in cross section. The wire or yarn having served its purpose of carrying the latex is then led again towards the point where a new supply of latex can be deposited thereon and preferably before it receives the new charge of latex it is subjected to a suitable cleaning action so that the new charge will be applied on a clean surface.

The latex to be applied may be mixed with flock of any description dyed or undyed so as to enable the finished product to absorb dyes, or the latex itself may be dyed or the coagulant used may have mixed therein any suitable dyeing compounds, pigments or the like. Moreover the powder may consist of dyed lakes or any combination of these methods may be employed.

According to the above described new process a rubber thread of practically any required diameter may be manufactured from the very finest to the very coarsest and the size being mainly governed by the following conditions:—

1. The strength and the compounding of the latex used.
2. The thickness and shape of the latex applied to the edge (which in the present case is a disc).
3. The period of immersion or contact with the coagulant.
4. The strength or concentration of the coagulant.
5. The pull which is exercised to separate the semi or coagulated predetermined shape from the edge.

6. The tension required to bring or form the freshly made thread into the required round cross sectional shape or otherwise.

When and if desired any of the foregoing solutions or mixtures which form the coagulant may be compounded with any suitable additions for the purpose of improving the final product, for example, in the case of rubber dispersions or solutions, accelerators, fillers, anti-oxidants, colouring matters, preservatives, vulcanising agents or softeners may or may not be included.

Figure 5:
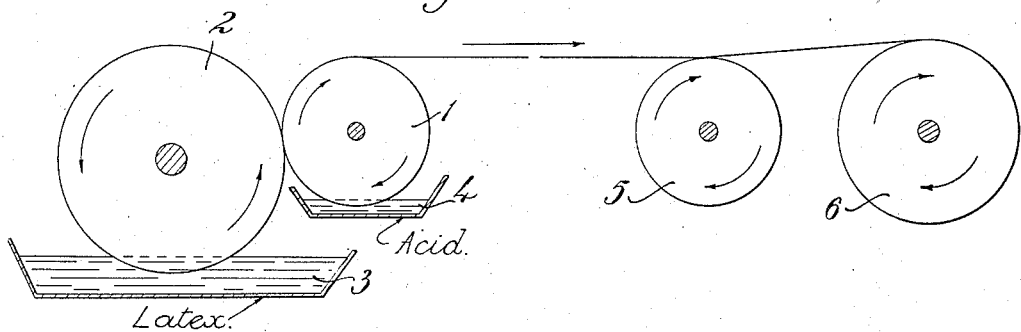

Such an arrangement as described with reference to Figure 3 may be slightly varied, for example, in a further modification, Figure 5, the forming wheel 1 may turn in an anti-clockwise direction to that above described and cause the forming disc to take up a thin line of solution, and as it rises out of the bath 3, such line or thread of solution comes into contact with the edge of a roller or disc 1 which runs in its own bath 4 of coagulant so that the acid and the solution are brought together in order to effect the desired coagulation.

The completed thread follows on with the rotating acid supply roller or disc, still continuing the coagulating process and the thread may then be drawn off therefrom for example by a disc 5 for further finishing treatment.

According to another embodiment, a similar arrangement may be used to that last described but in which the forming disc is adapted to rotate with its lower edge in contact with acid or other coagulant, whilst the solution is supplied on a contact roller or disc as before described, the solution meeting the coagulant as it rises out of the bath.

Figure 6:
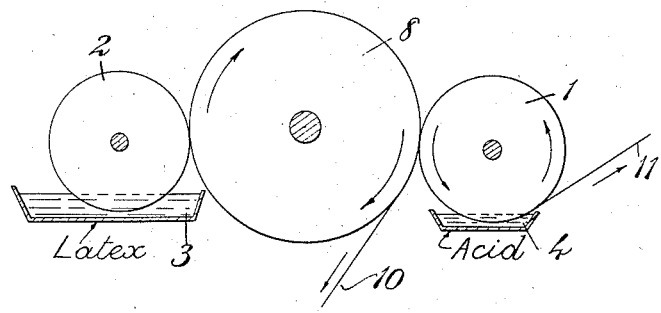

According to the next embodiment, Figure 6, there are provided a solution supply roller or disc 2 and an acid or coagulant supply roller or disc 1 and these are both separate and rotate with their lower edges in contact with the corresponding liquid in their respective baths 3 and 4.

Between these two discs there is arranged a carrying disc 8 and this disc or roller has its diametrically opposite edges in contact with the solution and acid discs or rollers respectively. Preferably the arrangement is such that with the carrying disc rotating clockwise, it will receive from the solution disc a thread which will then be carried round and brought into contact with a similar thread on the acid supply disc. The thread which is then immediately coagulated may be either led direct away from the carrying disc as at 10 or the coagulating thread may be led round by the acid disc down into the coagulating bath for completing the process of coagulation as at 11. The thread may then be drawn out of the bath in the ordinary way and led away for the appropriate finishing treatment.

Such an arrangement as that before described may be reversed, that is to say, the carrying disc may first pick up a thread of acid and then lead it into contact with a thread of latex.

Figure 7:
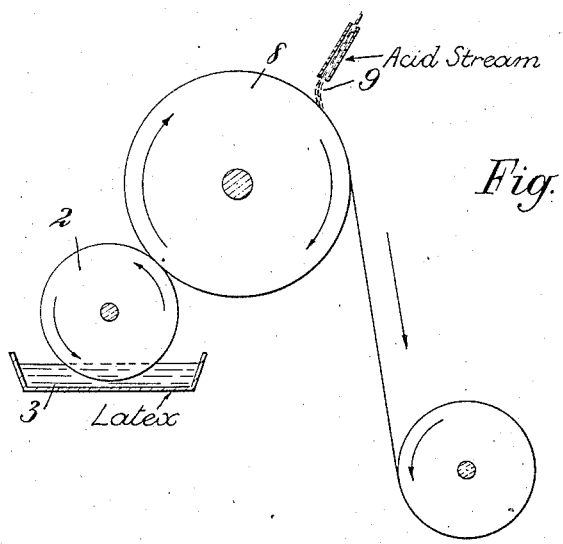

In another modification, Figure 7, the carrying disc 8 picks up a thread of latex and carries it round so that it is brought into contact with a stream 9 of acid or other coagulant to bring about the desired reaction.

It is to be understood that a number of discs may be arranged to all simultaneously receive a charge of solution or coagulant as the case may be and where they are immersed in a bath, the degree of immersion will be relatively very slight but the immersion may be increased depending upon the size of thread being formed. Further, the edge of the disc in any one case may be made with a finely cut groove to assist in the formation of the desired thread. Further, instead of the usual mixtures of liquid rubber, aqueous dispersion of latex or the like, any of the solutions which are employed in the artificial silk industry may be utilised, whereby threads or filaments of so-called artificial silk will be produced by coagulation from the discs arranged in the manner described.

Any of the arrangements described above may be fitted with the usual details such as heating devices for assisting the drying off of the thread or the partially completed threads may be passed through a heated chalk or other bath and again any suitable means may be employed to assist in the vulcanisation of the threads thus produced, where rubber is concerned.

It will be found that the process is a continuous one and that the speed of rotation of the discs may be relatively high and that, depending upon the viscosity of the solutions which are used, so the size of the thread may be varied.

Where and if necessary the rollers or other devices such as blankets, which receives the completed thread may travel at a faster speed than that at which the thread is delivered, so that a slight stretching effect may be imparted to the threads.

Where or if necessary a dye or dyes may be incorporated in the bath containing the solution or that containing the coagulant, so that the resulting threads will be already dyed.

It may also be noted that when the coagulated thread has to be taken away for further treatment, it is necessary to exert a certain pull to separate it from the disc. This has the result of somewhat stretching the thread, so that it receives a very smooth and non-frictional skin, which facilitates the subsequent weaving or knitting of the thread in a bare or uncovered condition.

I claim:

1. The process of producing rubber thread which consists in applying latex to a rotating member, transferring the latex to a second rotating member, applying a coagulant to the latex, withdrawing the coagulum from the second rotating member, and stretching it before the coagulation process is so advanced that stresses are set up by the stretching which tend to retract the thread thereby obtaining a thread of permanently smaller cross section.

2. The process as claimed in claim 1, in which the latex is transferred to and coagulated on a knife edge on the second rotating member.

3. The process as claimed in claim 1 in which the latex is transferred to and coagulated in a groove in the second rotating member

THOMAS LEWIS SHEPHERD.